United States Patent
O'Gorman et al.

(10) Patent No.: US 7,339,327 B2
(45) Date of Patent: Mar. 4, 2008

(54) RESONANT CIRCUIT FOR HALOGEN LIGHTING

(75) Inventors: Patrick A. O'Gorman, Grayslake, IL (US); Dennis L. Stephens, Barrington, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 53 days.

(21) Appl. No.: 11/034,174

(22) Filed: Jan. 11, 2005

(65) Prior Publication Data

US 2006/0152168 A1 Jul. 13, 2006

(51) Int. Cl.
*H05B 37/02* (2006.01)
(52) U.S. Cl. ............... 315/244; 315/224; 315/DIG. 7
(58) Field of Classification Search ........... 315/224, 315/244, 242, DIG. 5, DIG. 7
See application file for complete search history.

(56) References Cited

U.S. PATENT DOCUMENTS

| | | | |
|---|---|---|---|
| 4,904,907 A | 2/1990 | Allison et al. | |
| 5,270,620 A | 12/1993 | Basch et al. | |
| 5,677,602 A * | 10/1997 | Paul et al. | 315/224 |
| 5,783,872 A | 7/1998 | Blair | |
| 6,377,131 B1 | 4/2002 | Langer | |
| 6,515,437 B1 | 2/2003 | Zinkler et al. | |
| 6,909,246 B2 * | 6/2005 | Hein | 315/248 |

| | | | |
|---|---|---|---|
| 2004/0113570 A1 * | 6/2004 | Ribarich et al. | 315/307 |

FOREIGN PATENT DOCUMENTS

WO  WO 02/077739 A1  10/2002

OTHER PUBLICATIONS

Masrur, M. Abul et al.: Can an Ac (Alternating Current) Electrical System Replace the Present DC System in the Automobile? An Investigative Feasibility Study-Part I: System Architecture, IEEE Transactions on Vehicular Technology, vol. 47, No. 3, Aug. 1998, pp. 1072-1080.
Sobierajski, George and Peterson, William: A Wide Bandwidth, Low Noise Xenon Lamp Ballast, 0-7803-7883-0/03/$17.00 © 2003 IEEE, pp. 316-320.
Gulko, Michael and Ben-Yaakov, Sam: A MHz Electronic Ballast for Automotive-Type HID Lamps, 0-7803-3840-5/97/@10.00 © 1997 IEEE, pp. 39-45.
Lin, Tsai F. et al.: An Electronic Gear for Short-Arch Xenon Lamps, PCC-Osaka 2002, 0-7803-7156-9/02/$10.00 © 2002 IEEE, pp. 1468-1472.
Jirasereeamornkul, Kamon et al.: High-Efficiency Electronic Transformer for Low-Voltage Halogen Lamp, 0-7803—7761-3/03/$170.00 © 2003 IEEE, pp. III-355-III-358.

* cited by examiner

*Primary Examiner*—David H. Vu

(57) ABSTRACT

An apparatus and method for driving a halogen lamp. A driving circuit is provided that is operable near a series resonance frequency. The driving circuit is coupled to the lamp in a series configuration. During startup, the circuit is driven above resonance. After the lamp has warmed up, the circuit is driven substantially at resonance. A controller is coupled to the driving circuit. The controller is operable to control the frequency of operation of the driving circuit.

16 Claims, 4 Drawing Sheets

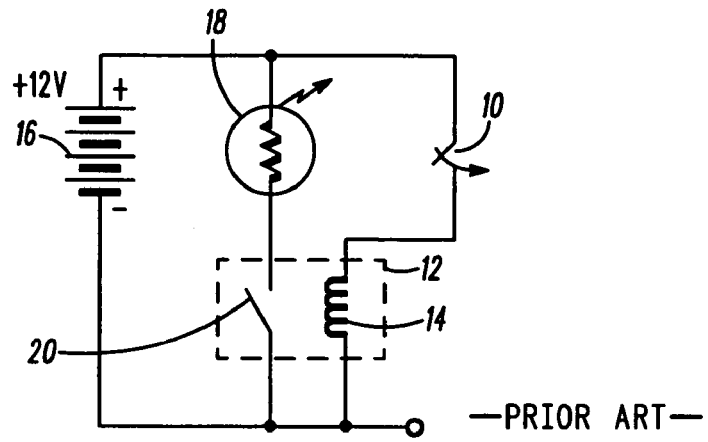
FIG. 1 —PRIOR ART—
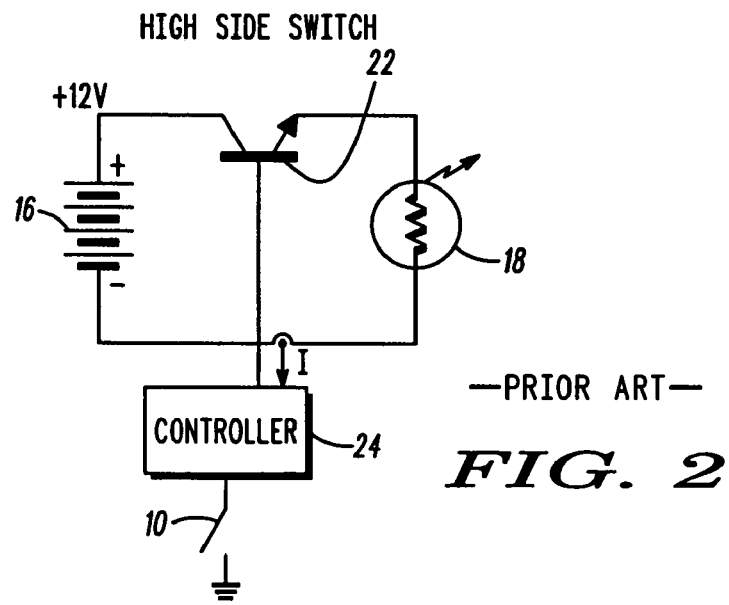
FIG. 2 —PRIOR ART—
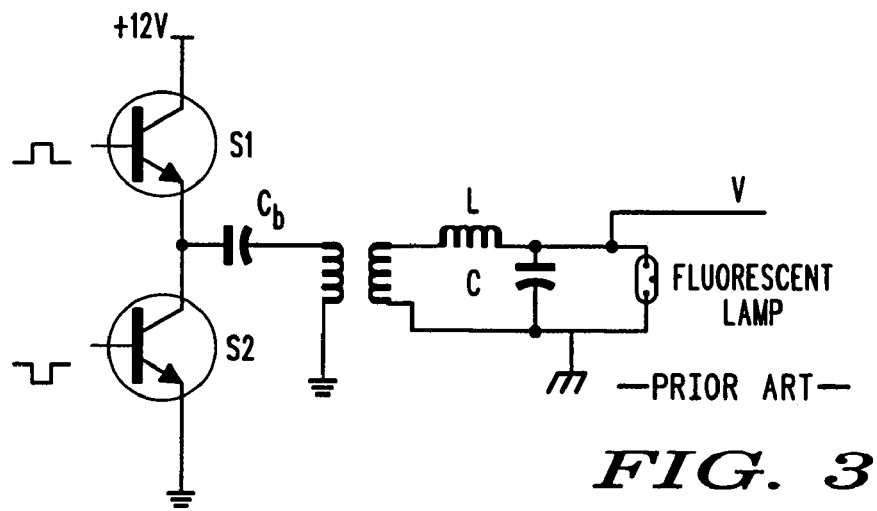
FIG. 3 —PRIOR ART—

RESONANT CIRCUIT FOR HALOGEN LIGHTING

FIELD OF THE INVENTION

The present invention relates generally to a lighting system and method. More specifically, the invention relates to a lighting apparatus for halogen lamps and method, for example though not exclusively, for use in automotive applications.

BACKGROUND OF THE DISCLOSURE

Lighting of incandescent lamps or light bulbs in, for example, automotive applications typically involves driving a twelve volt (12V) filament. In the past, 12V low beam incandescent lights were switched on via a relay which connected the battery voltage directly across the lights, wherein the current through the filament depended on its resistance. Typically, the resistance of a cold filament can be ten times less than the resistance of a hot filament. As a result, the inrush current can be ten times the running current of a light, leading to thermal stress on the light filament and premature failure. With low-cost incandescent lamps, this shortened lifetime has not been a problem. However, with the advent of higher cost lights, such as halogen lamps for example, it is desirable to lengthen the life of the lamp where possible.

One solution for extending lamp life is to limit the inrush current to the lamp by adding current limiting circuitry. The current limiting circuitry, if linear, adds dissipation and can fail if the lamp is shorted. The linear circuitry also lowers the voltage to the lamp, which in a halogen lamp reduces life if the filament is not hot enough to initiate the "Halogen Cycle". Sustained low voltage on a halogen lamp can cause blacking of the glass and filament breakage due to filament diameter reduction. Another method of current limiting is a high side switch which pulse-width-modulates the battery voltage to the lamp during the inrush period. After the inrush period is over and the filament is hot, the high side switch is turned on continuously, wherein dissipation is lower but there is no regulation of the lamp when the battery voltage dips again resulting in reduced lamp life. Other lighting solutions provide for different lamp configuration such as metal halide/Xenon and high intensity discharge (HID) discharge lamps. However, these other lamp systems have high voltage requirements, which can exhibit electromagnetic interference, and complex control circuitry, which adds significant cost to the lighting system. In addition, pulse width modulation voltage control can cause electromagnetic interference (EMI) with radio equipment in the vehicle as well as interference with other communication devices near the vehicle.

Therefore, there is a need in the art for a cost effective and efficient way to control current in a halogen lamp.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

FIG. 1 shows a schematic diagram of a first prior art lamp driving circuit;

FIG. 2 shows a schematic diagram of a second prior art lamp driving circuit;

FIG. 3 shows a schematic diagram of a third prior art lamp driving circuit for a fluorescent lamp;

DETAILED DESCRIPTION OF EMBODIMENTS OF THE INVENTION

Figure 4:
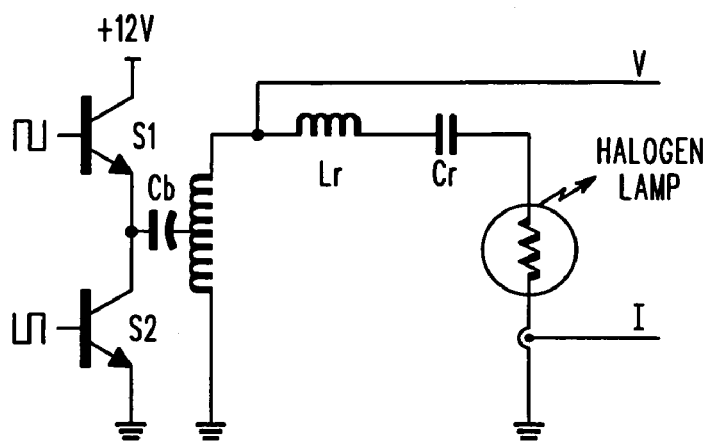
FIG. 4 shows a simplified schematic diagram of a lamp driving circuit for a halogen lamp, in accordance with the present invention.

The present invention provides a resonant driving circuit which will accomplish efficient current control in a halogen lamp, thereby extending lamp life. As a result, the solution of the present invention is cost effective. Typically, halogen lighting systems use DC power. However, the present invention uses resonant elements to provide an AC drive current. In practice, the use of a resonant driving circuit requires that the operating frequency and component values be properly designed to avoid uncontrolled behavior. In the present invention, a technique will be described which allows the circuit to operate substantially at the resonance point for the halogen lamp, which could produce destructive results in other lamp types, such as fluorescent, HID and Xenon.

FIG. 1 shows a prior art circuit that has been used in automotive applications for many years. A switch 10 controls the operation of a relay 12. The switch can be located on the dashboard of a vehicle, for example. The relay coil 14 is energized by a battery 16 upon closing of the dashboard switch 10. The energized relay coil 14 causes the relay contacts 20 to close, whereupon battery voltage is supplied directly to the lamp 18. There is no current inrush protection and lamp life is reduced as a result. In practice, the inrush current can be about ten times the running current value due to the lamp resistance of a cold lamp filament being about one tenth the running (hot) resistance value.

FIG. 2 shows a prior art circuit topology to limit inrush current to the lamp 18. In this case, a high side transistor switch 22 is used to limit inrush current under control of a controller 24. In operation, when the high side switch 22 is turned on and the lamp 18 is cold, an overcurrent detection circuit, in the controller 24 for example, turns the switch off or limits current if the current through the lamp exceeds a predetermined threshold, which is set well below ten-times the running current value. However, in this circuit, if the battery voltage dips due to a large change in load current in another circuit in the vehicle, the light output of the lamp will fall because this circuit does not boost the output voltage. If this lower voltage persists, halogen lamp life is reduced due to tungsten filament material blackening the glass envelope. In addition, the filament is weakened due to the material that is emitted from the filament and is deposited on the glass. To accomplish voltage boost, a separate DC boost circuit (not shown) would need to precede the high side switch shown here. This added circuitry adds significant cost to the lamp drive circuit.

Resonant circuits are known for driving particular lamp systems in the prior art. However, series resonant, series-loaded AC driving circuits are not known in driving halogen lighting systems, as is introduced in the present invention. For example, FIG. 3 shows a prior art series resonant parallel-loaded resonant circuit which is used today in resonant ballast applications for controlling fluorescent lights and high-intensity-discharge (HID) lamps which have negative impedance curves. Switches S1 and S2 are switched as a square wave at a frequency above the resonant frequency of the LC driving circuit. It is necessary to operate this circuit well above resonant frequency to avoid runaway currents due to the negative impedance of the fluorescent lamp. The values of the LC components are chosen to provide a guardband for the operating frequency to ensure that the circuit never crosses the resonant point. Current to the lamp 18 is regulated by changing the switching frequency, wherein an increase in frequency increases the impedance of the LC circuit and the load current is reduced accordingly. The negative impedance characteristic of the lamp also causes the impedance of the lamp to increase as well. A decrease in frequency results in a decrease in impedance of the LC circuit and the negative impedance lamp so that load current is subsequently increased. However, the necessity of operating well above resonance makes this circuit inefficient for driving halogen lamps, inasmuch as the halogen lamp has a positive impedance characteristic, wherein additional current increases the temperature of the filament which increases its impedance. The LC circuit can provide voltage gain at the cost of additional circulating current in the LC Circuit. Unfortunately, this current has increased dissipation in the switching devices, and the voltage gain is needed to keep the lamp at a fixed voltage when the input voltage dips.

FIG. 4 shows a series-loaded, series-resonant circuit, in accordance with the present invention, that is better suited for operating a halogen lamp. The LC circuit current is in series with the lamp thus the LC current is utilized by the lamp to produce light. This increases the efficiency of the driving circuit.

Figure 5:
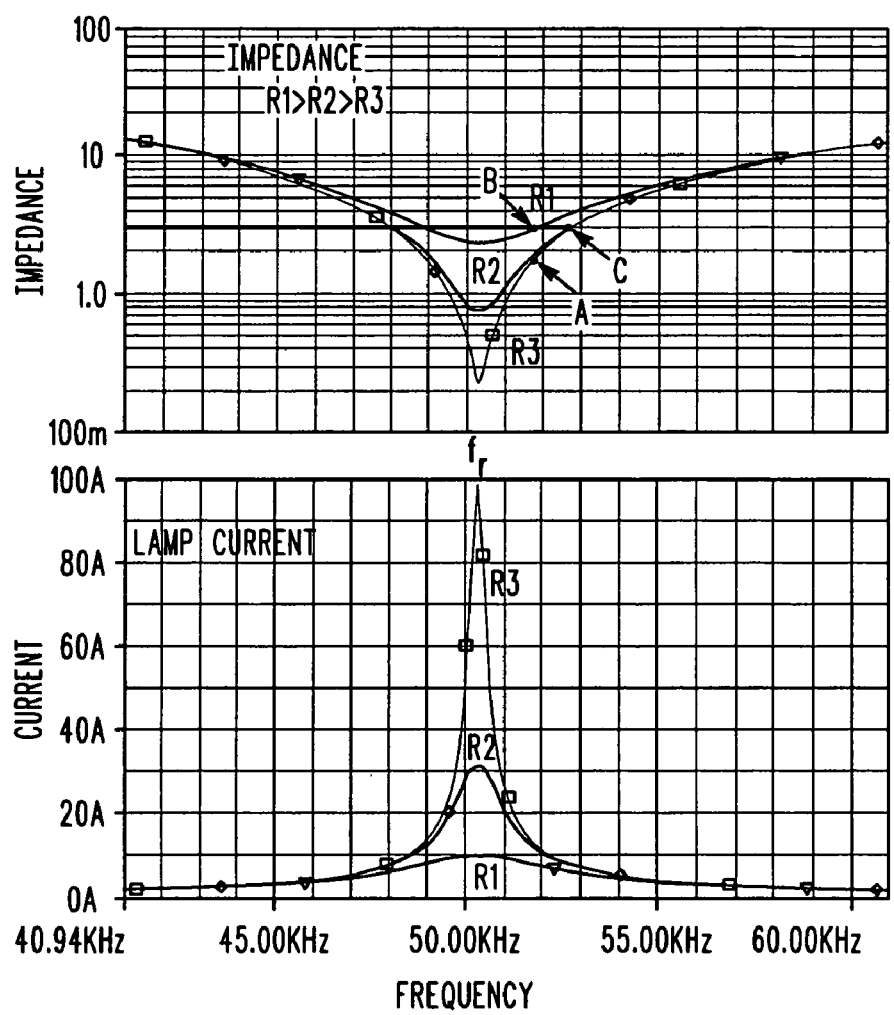
FIG. 5 shows a graphical representation of resonant tank impedance versus frequency for various loads.

A plot of impedance versus frequency and lamp current is shown in FIG. 5 for typical values of halogen lamp resistance. At the resonant frequency, $f_r$, of the LC circuit the impedance is at a minimum, essentially equal to the impedance of the halogen lamp: R1, R2 or R3 depending upon temperature. The circuit impedance curve changes as a function of load resistance. Above or below resonance the impedance increases at a rate that is less dependant upon the load. The rate of impedance change is higher for higher load current. Therefore, as a lamp is lit, the load presented to the driving circuit will increase from point A to B. If the battery voltage is constant, the desired impedance is a horizontal line 40 as shown. Therefore, it is desirable to change frequency to maintain the same impedance. For example, the frequency can be lowered during lighting of the lamp to maintain a relatively constant impedance, such as from point C to B. In practice, the frequency of the driving square wave voltage is modified to maintain a constant load current. If battery voltage falls, the horizontal constant impedance line 40 will move lower to maintain constant current.

The operating frequency should be above the resonant frequency so that the current lags the voltage in switches S1 and S2, thereby reducing the associated switching losses. The variation of the frequency can be automatically varied by a closed loop which compares desired lamp current to actual current and varies frequency accordingly. This type of AC waveform technique is typically used in the fluorescent ballast industry. However, this prior art application is completely different from the present invention, inasmuch as the impedance of a fluorescent light is negative, whereas the impedance of the halogen lamp, such as is used in an automotive application for example, presents a positive impedance. For example, a fluorescent lamp needs the series-resonant, parallel-loaded resonant circuit of the prior art to provided a large strike voltage to run voltage ratio. Such a series-resonant, parallel-loaded resonant circuit could operate a halogen lamp but is very inefficient compared to the series loaded circuit of the present invention, which itself would be very inefficient on a fluorescent lamp. In the parallel-loaded circuit the resonant frequency moves with load. Consequently, the choice of the characteristic impedance of the LC circuit ($\sqrt{L/C}$) is different between the two applications, and the operating frequencies are necessarily different.

Figure 6:
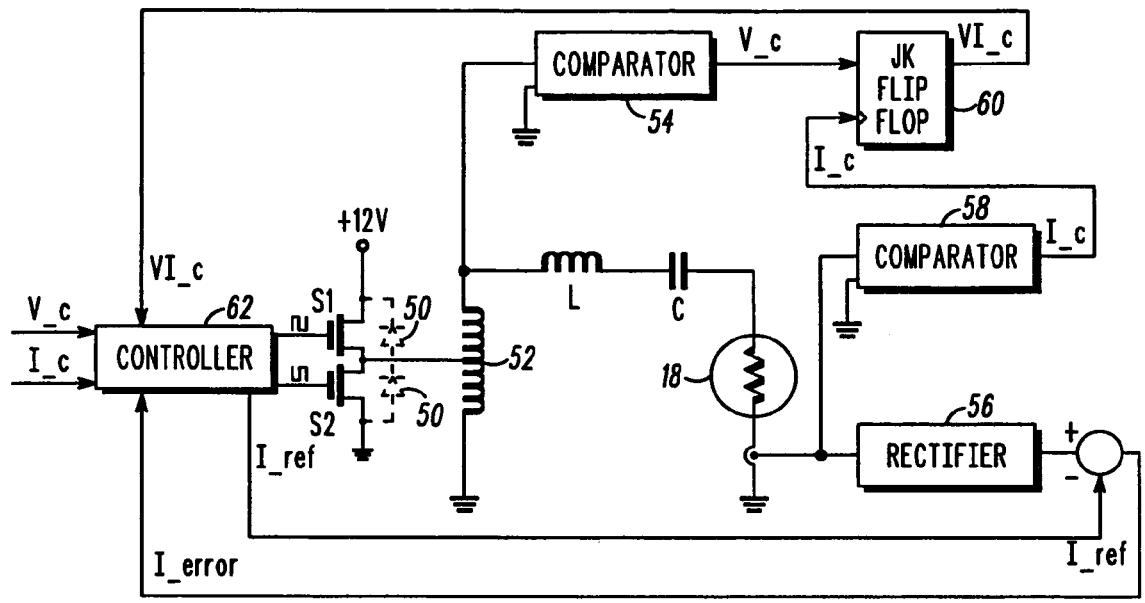
FIG. 6 shows a schematic diagram of a system overview with controls, in accordance with the present invention.

FIG. 6 shows a halogen lamp driving circuit, in accordance with the present invention. Specifically, an AC series resonant circuit is used to drive a series loaded halogen lamp, such as can be used in an automotive lighting application for example. In addition, the present invention controls the circuit to minimize losses in the switching drive transistors S1, S2. The switching transistors are preferably FET devices with inherent parasitic diodes 50 as shown. However, bipolar devices can also be used with the addition of free-wheeling diodes 50, such as are shown.

This circuit solves several problems with halogen lighting circuits: efficiency, limiting inrush protection, providing a dimming function, and providing a boost. The amount of boost required depends on the minimum battery voltage and the impedance of the circuit. At the lowest voltage, operation very close to or at resonance is beneficial because it reduces the amount of boost required in the transformer 52, thereby minimizing losses in the circuit. At resonance, the reactive power is minimized and current only flows through the switching transistors S1 and S2, and not through the free-wheeling diodes 50.

In practice, circuit component variances due to manufacturing tolerances and temperature variations result in a circuit impedance which does not remain constant. In the prior art, the solution is to operate the switching frequency with enough frequency guardband to keep the driver circuit operation well above resonance, such that operation below resonance can not occur. However, operation well above resonance increases power loss in the circuit. Advantageously, the present invention allows operation very close to, or at, resonance without the need to measure current phase accurately. Note that in the present invention it is only important to know the phase of the current relative to the voltage for operation close to resonance, and it is not important to know all parts of the current waveshape.

Figure 7:
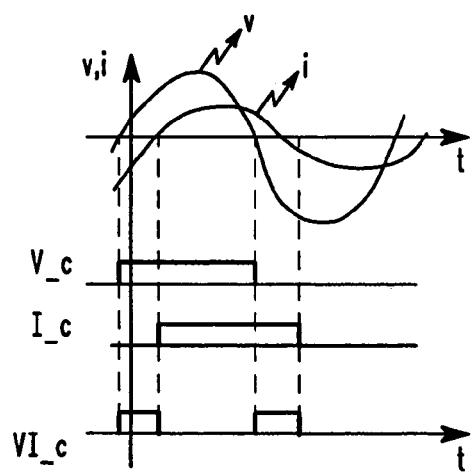
FIG. 7 shows a graphical representation of the resonance circuit drive logic, in accordance with the present invention.

An example of the circuit operation is shown in FIGS. 6 and 7. A controller 62 provides complementary square wave signals to switching transistors S1 and S2. Preferably, the controller 62 includes pulse-width modulation (PWM) circuitry. However, other frequency-controlled AC drive circuits, as are known in the art can be used equally well in the present invention. The PWM circuitry provides the advantage of adjusting either of the PWM frequency or pulse width to control AC amplitude as it relates to LC resonant frequency. The transistors are coupled to a transformer 52 that can be used to boost the drive voltage, as needed. Components L and C provide a series resonant circuit, which filter the square wave drive signal to provide a fundamental AC signal to drive a series-loaded halogen lamp 18. Typical operating frequencies are in the range of 50 kHz to 100 kHz. The resonant capacitor is in the microfarad range as well as the inductor in the ten's of microhenry range. The values are chosen from the impedance variation of the lamp load from cold to hot and the minimum to maximum battery voltage.

Two comparators 54, 58 are coupled to the circuit to provide a digital indication of the phase of the drive circuit voltage, V_c, and current, I_c. It should be noted that the exact values of these voltage or currents are not needed. Only their phase relationship is needed. FIG. 7 shows typical waveforms when the circuit operates above resonance. The operation of the circuit above resonance results in the drive voltage leading the drive current in phase, as shown. The voltage comparator 54 simply determines when the drive voltage goes through a zero-crossing as a phase indication, shown as logic signal V_c. The current comparator 58 simply determines when the drive current goes through a zero-crossing as a phase indication, shown as logic signal I_c. As can be seen in the timing diagram, logic signal V_c leads I_c. The two signals are fed to a JK-type flip-flop 60 to provide an exclusive-OR function, V_c $\oplus$ I_c, or VI_c. In the example show the current signal I_c is used to clock V_c in the flip-flop 60. However, the voltage signal V_c could also have been used equally well to clock I_c in the flip-flop. Preferably, if the controller 62 has enough circuit sophistication, the signals I_c and V_c can be fed directly thereto, wherein the controller can not only provide the exclusive-OR function, but can also determine whether the circuit is operating above or below resonance. For example, at the I_c transition, if V_c is high then the circuit is operating above resonance. However, if V_c is low at the I_c transition then the circuit is operating below resonance.

The width of the pulse VI_c provides an indication of how far above resonance the circuit is being driven. This signal VI_c is then used by the controller 62 to adjust its PWM signal to drive the circuit to resonance. For example, the controller will change the frequency of operation of the circuit to minimize the pulse width. At resonance the drive voltage will no longer lead the current, being in phase, and the pulse width will go to zero. If it were to occur that the circuit goes below resonance, the current will lead the voltage and the pulse width will again increase. Therefore, the width of the pulse can tell how far away from resonance the circuit is operating, but not if the circuit is above or below resonance. However, if the controller 62 is fed the individual V_c and I_c signals, as is preferred, it is easily determined which signal is leading which, and how the controller can modify the PWM signal to drive the circuit to resonance.

Referring back to FIG. 6, a rectifier 56 can also be coupled to a current sensor to detect the absolute current going through the lamp 18. The rectified signal can then be compared to a desired drive signal, I_ref, from the controller 62 to provide an error signal, I_error, to determine how efficiently the drive circuit is operating. The rectifier 56 can include a filter and ADC (not shown) to provide a digitized signal. Moreover, the circuit blocks associated with the rectifier 56 could also be incorporated into the controller as desired.

In operation, the drive circuit is operated above resonance when lamp resistance is low (i.e. during startup) and operated substantially at resonance, using feedback, when load resistance of the lamp has substantially stabilized. To drive the circuit towards resonance, if the pulse width of VI_c is above a desired level, the controller will correct the PWM drive signals to control the operating frequency of the circuit to lower the pulse width of VI_c. Specifically, if VI_c is HI, the controller will correct the switching frequency by $$f\_sw\_new = f\_sw\_old - (K*VI\_c)$$

where f_sw_new is the new switching frequency, f_sw_old is the old switching frequency, and K is an error term related to I_error. However, if VI_c is LO, the controller will correct the switching frequency by $$f\_sw\_new = f\_sw\_old + (K*VI\_c)$$

Once the circuit operates at or near resonance, the voltage to the load is controlled by reducing the pulse width from a square wave so that the amplitude of the fundamental is controlled. In this way, losses in the switches are minimized and the current through the lamp is controlled. With this configuration, the controller can regulate the average output current, so keeping the light output constant as the supply rail changes. Preferably, where more than one lamp is being driven, the controller can spread the lamp switching times so, whenever possible, at most only one lamp has power at any one instant. In this way, electromagnetic interference and resistive power loss are minimized. Optionally, during inrush (startup) of a lamp, the controller can regulate current by either: a) operating at resonance but using PWM to regulate current, or b) operating off-resonance will a full width PWM signal to limit current. Either method is acceptable but option a) is preferred because it generates less electromagnetic interference.

Figure 8:
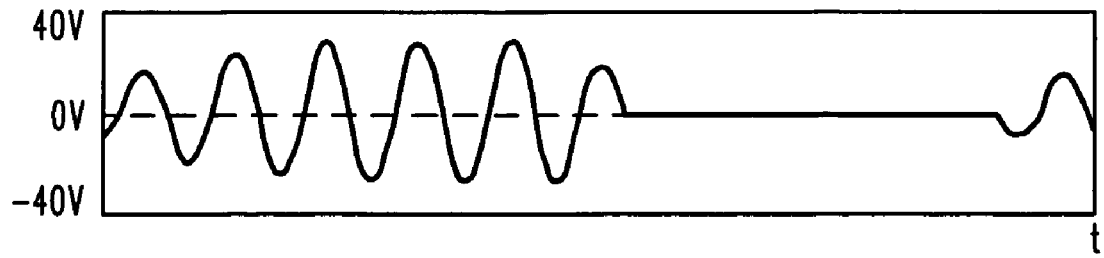
FIG. 8 shows a graphical representation of a dimming function, in accordance with the present invention.

The present invention also provides a dimming or brightness function, which is advantageous in automotive applications, by using pulse skipping, as shown in FIG. 8. In this case, the controller skips PWM pulses to the drive circuit, thereby reducing average current to the lamp, and therefore its brightness. Preferably, the amplitude of the current is also reduced before and after pulse skipping to minimize transient noise or spikes in the system. Pulse-skipping can also be used in normal operation to regulate current when the lamp is warmed up. It is not desirable to use pulse-skipping during startup as the low lamp resistance and transients can cause excessive peak current.

Of course, it will be appreciated that any number of halogen lamps may be used on this system, from a single bulb to any number of bulbs. Optimal electromagnetic interference and low peak currents may be achieved with placement of the bulb loads on outputs based on probability of simultaneous operation and bulb wattage as well as operating voltage range. For example, instead of having two lamps switched at the same time, one lamp can be switched on when the other is switched off. As a result, optimum low levels may be achieved by minimizing the current ripple on the power input.

Figure 9:
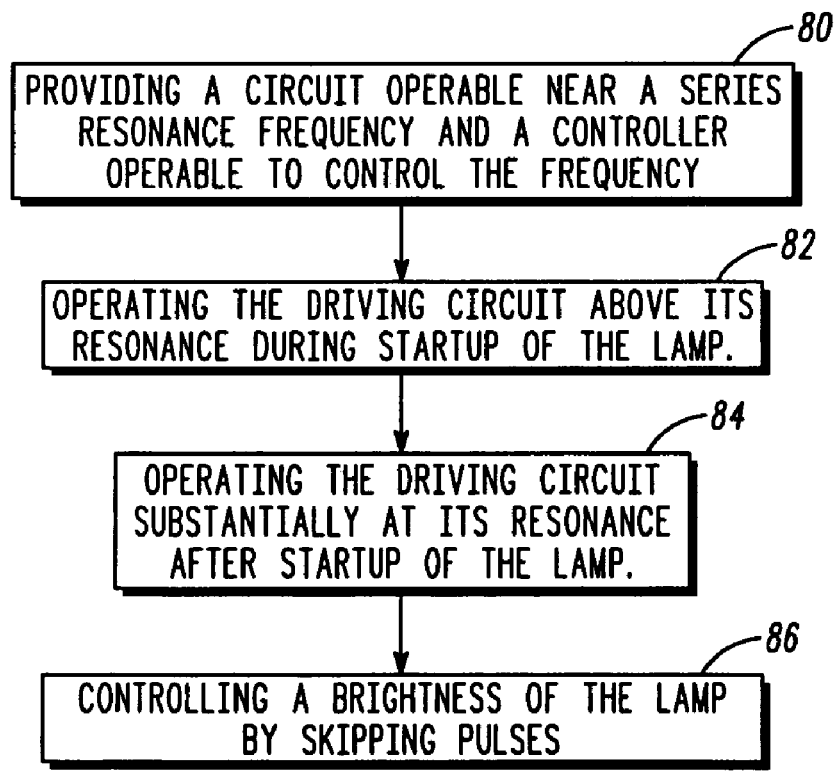
FIG. 9 is a flow chart showing a control method, in accordance with the present invention.

Referring to FIG. 9, the present invention also includes a method for driving a halogen lamp. The method includes a first step 80 of providing a driving circuit for the lamp that is operable near a series resonance frequency, and a controller operable to control the frequency of operation of the driving circuit. A next step 82 includes operating the driving circuit above its resonance during startup of the lamp. A next step 84 includes operating the driving circuit substantially at its resonance after startup of the lamp. Preferably, the operating steps 82, 84 include operating the driving circuit in an alternative current (AC) mode. More preferably, the operating after startup step 84 occurs after a resistance of the lamp has substantially stabilized. Specifically, this step 84 includes frequency controlling the driving circuit with PWM signals to regulate an output current to the lamp. Optionally, the method includes the further step 86 of controlling a brightness of the lamp by skipping pulses in the AC drive current. Preferably, an amplitude of the current is reduced before and after pulse skipping to reduce transients. A further enhancement (not shown) is to dither the switching frequency to control the lamp current when the lamp impedance is stable. Due to the low time constant of the filament, the current is averaged and controlled. The electromagnetic interference is minimized with this operation.

The present invention applies a unique technique for driving halogen lamps, such as are used in the automotive industry. The technique is different from prior art ballast applications since in fluorescent applications there is no inrush current because the lamp is initially a high impedance and is reduced as the lamp warms up, in contrast to the case of the present invention. Also, the circuit is operated in a closed loop manner to maintain maximum efficiency operation in the presence of component tolerances and temperature variations. Further, a fluorescent ballast cannot operate near resonance with a simple LC ballast (needing an additional ballast element) because the lamp impedance is negative. The overall circuit impedance must be positive if the lamp current is to be controlled effectively. A halogen lamp however has a positive impedance characteristic and operation of the LC circuit at resonance is desirable, as described earlier. Consequently, the choice of LC values and the operation of the feedback loop are very different than for a fluorescent ballast. For example, the halogen lamp could be operated at DC while a fluorescent is damaged by DC current. The present invention proposes using the halogen lamp at AC current rather than DC. It is known that as DC current is applied to a tungsten filament at very high temperatures the metal migrates along the DC field. This causes a narrowing of the filament and eventual breakage. However, with an AC current applied to the filament, as in the present invention, this migration doesn't occur and therefore the lamp life is longer.

While the present invention has been particularly shown and described with reference to particular embodiments thereof, it will be understood by those skilled in the art that various changes may be made and equivalents substituted for elements thereof without departing from the broad scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

We claim:

1. An apparatus for driving a halogen lamp, the apparatus comprising:
    a series-resonant driving circuit operable near a series resonance frequency, the series-resonant driving circuit coupled to the halogen lamp in a series configuration; and
    a controller coupled to the series-resonant driving circuit, the controller operable to control a frequency of operation of the series-resonant driving circuit.

2. The apparatus of claim 1, wherein the series-resonant driving circuit is operated in an alternating current (AC) mode.

3. The apparatus of claim 2, wherein the controller controls a brightness of the halogen lamp by skipping pulses in the AC drive current.

4. The apparatus of claim 1, wherein upon lighting of the halogen lamp, the controller controls an inrush current to the lamp by operating the series-resonant driving circuit at a frequency above the series resonance frequency.

5. The apparatus of claim 4, wherein after lighting of the halogen lamp, the controller operates the series-resonant driving circuit substantially at the series resonance frequency.

6. The apparatus of claim 1, wherein the controller controls the frequency of operation of the series-resonant driving circuit to regulate an output current to the halogen lamp.

7. An apparatus for driving a halogen lamp, the apparatus comprising:
    an alternating current (AC) series-resonant driving circuit operable near a series resonance frequency, the series-resonant driving circuit coupled to the halogen lamp in a series configuration; and
    a controller coupled to the series-resonant driving circuit, the controller operable to control a frequency of operation of the series-resonant driving circuit to regulate an output current, wherein
        upon lighting of the halogen lamp, the controller controls an inrush current to the lamp by operating the series-resonant driving circuit at a frequency above the series resonance frequency, and
        after lighting of the halogen lamp, the controller operates the series-resonant driving circuit substantially at the series resonance frequency.

8. The apparatus of claim 7, wherein the controller controls a brightness of the halogen lamp by skipping pulses in the AC drive current.

9. The apparatus of claim 8, wherein an amplitude of the current is reduced before and after pulse skipping.

10. The apparatus of claim 7, wherein the controller operates the series-resonant driving circuit substantially at the series resonance frequency when a resistance of the halogen lamp has substantially stabilized.

11. A method for driving a halogen lamp, the method comprising the steps of:
    providing (i) a series-resonant driving circuit for the halogen lamp, wherein the series-resonant driving circuit is operable near a series resonance frequency and (ii) a controller operable to control a frequency of operation of the series-resonant driving circuit;
    operating the series-resonant driving circuit above the series resonance frequency during startup of the halogen lamp; and
    operating the series-resonant driving circuit substantially at the series resonance frequency after startup of the halogen lamp.

12. The method of claim 11, wherein the operating steps include operating the series-resonant driving circuit in an alternating current (AC) mode.

13. The method of claim 12, further comprising the step of controlling a brightness of the halogen lamp by skipping pulses in the AC drive current.

14. The method of claim 13, wherein an amplitude of the current is reduced before and after pulse skipping.

15. The method of claim 11, wherein the operating after startup step occurs after a resistance of the halogen lamp has substantially stabilized.

16. The method of claim 11, wherein the operating after startup step includes frequency controlling the series-resonant driving circuit with PWM signals to regulate an output current to the halogen lamp.

* * * * *